(12) United States Patent
Dieterich

(10) Patent No.: US 6,891,565 B1
(45) Date of Patent: May 10, 2005

(54) BITSTREAM TESTING METHOD AND APPARATUS EMPLOYING EMBEDDED REFERENCE DATA

(75) Inventor: Charles Benjamin Dieterich, Middlesex, NJ (US)

(73) Assignee: Sarnoff Corporation, Princeton, NJ (US)

( * ) Notice: Subject to any disclaimer, the term of this patent is extended or adjusted under 35 U.S.C. 154(b) by 581 days.

(21) Appl. No.: 09/588,276

(22) Filed: Jun. 6, 2000

Related U.S. Application Data

(60) Provisional application No. 60/144,425, filed on Jul. 16, 1999.

(51) Int. Cl.[7] .......................... H04N 17/00; H04N 17/02
(52) U.S. Cl. ......................... 348/180; 348/184; 348/189
(58) Field of Search ................................ 348/180, 189, 348/192, 193, 184, 397.1; 375/224, 225, 226, 227, 228, 240.13

(56) References Cited

U.S. PATENT DOCUMENTS

| 5,040,061 A | * | 8/1991 | Yonemitsu | ............. | 375/240.13 |
| 5,706,002 A | | 1/1998 | Meehan et al. | | |
| 5,731,839 A | | 3/1998 | Panaro | | |
| 5,798,788 A | | 8/1998 | Meehan et al. | | |
| 6,337,710 B1 | * | 1/2002 | Watkins | ....................... | 348/180 |
| 6,400,400 B1 | * | 6/2002 | Isnardi et al. | ................ | 348/180 |
| 6,421,749 B1 | * | 7/2002 | Devlin et al. | ................ | 382/232 |
| 6,483,538 B2 | * | 11/2002 | Hu | .............................. | 348/180 |

OTHER PUBLICATIONS

Isnardi, Michael, *MPEG–2 Video Compression*, Nov. 29, 1999, 67 Pages.
Sarnoff Corporation, *Extending Broadcast and Video Distribution*, Dec. 2, 1999, 6 Pages.

* cited by examiner

*Primary Examiner*—John Miller
*Assistant Examiner*—Trang U. Tran
(74) *Attorney, Agent, or Firm*—William J. Burke

(57) ABSTRACT

A method of testing a decoder of a coded bitstream utilizes a test bitstream, containing in part embedded reference data, that is applied to a decoder being tested to produce a test result image that evidences whether or not the decoder correctly or incorrectly decodes the test bitstream. In an MPEG or an MPEG-like coding, for example, the test bitstream comprises a sequence of pictures representing at least one reference image portion, wherein at least one picture of the sequence of pictures typically is an intra-coded representation of the reference image portion and subsequent pictures of the sequence of pictures include an intra-coded representation of the reference image portion and a predictively coded representation of the reference image portion.

29 Claims, 2 Drawing Sheets

```
S1 — I P P P P P P P P P P P P I P P P P P P P P P P P P
S2 — I P P P P P P P P I P P P P P P P P I P P P P P P P
S3 — I P P P P I P P P P I P P P P I P P P P I P P P ...
S4 — I P P I P P I P P I P P I P P I P P ...
S5 — I P I P I P I P I P I P I P ...
```
|← 1/15 SEC. →|
|←——————— 1 SEC. ———————→|
FIG. 4
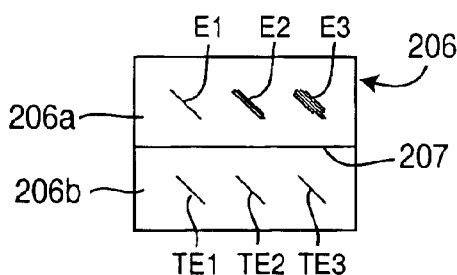
FIG. 5A
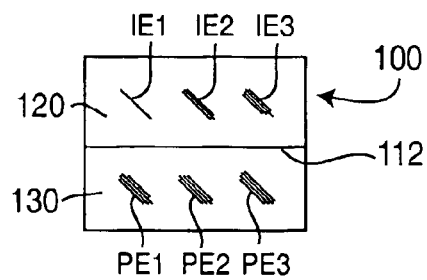
FIG. 5B
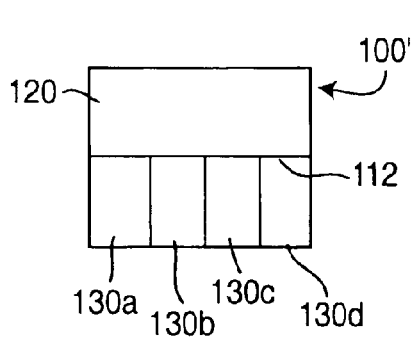
FIG. 6
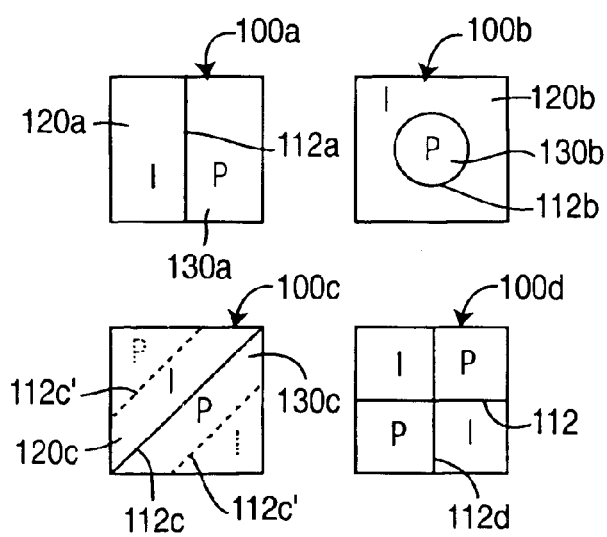
FIG. 7

BITSTREAM TESTING METHOD AND APPARATUS EMPLOYING EMBEDDED REFERENCE DATA

This application claims the benefit of U.S. Provisional Application Ser. No. 60/144,425 filed Jul. 16, 1999.

The present invention relates to a method for testing the decoding of coded signals by a decoder and, in particular, to a method that employs reference data embedded in a bitstream for so testing a decoder.

Information is increasingly being coded into digital formats as sequences of digital data representative of the information coded, i.e. coded in a digital bitstream. Rather than specifying the details of the design of the digital coders and decoders that are to be employed for such purpose, the general coding/decoding methodology, format, syntax and/or coding protocols are increasingly being specified leaving up to the providers of the coders and decoders the specifics of the design thereof. As the coding specifications become more complex and involve higher levels of abstraction from the particular information being coded, it becomes increasingly likely that a particular coder and/or decoder will, at least in some respect, fall short of the ideal of perfect compliance with the digital coding standard.

Such coding standards include the MPEG (Motion Picture Experts Group) coding standards, such as ISO/IEC International Standards 11172 and 13818, usually referred to as "MPEG-1" and "MPEG-2", respectively, which establish a standard coding methodology and syntax for picture and audio information. Digital decoders available from various sources may or may not faithfully decode an MPEG-compliant bitstream, or may properly decode a certain compliant bitstream in part, but not properly respond to certain coding features and syntax elements.

One solution to compliance testing such decoders is the process of obtaining a compliance testing bitstream ("compliance bitstream") that include a set of video bitstreams which systematically test that a decoder properly handles and decodes a predefined set of MPEG syntax elements, and applying that set of video bitstreams to test a decoder under test (D.U.T.). I.e. a known bitstream input produces known brightness values if the decoder correctly decodes the bitstream. In compliance bitstreams available from Sarnoff Corporation of Princeton, N.J., for example, a clean "VERIFY" screen display (e.g., a picture having the word "VERIFY" in white on a grey background) is produced at the end of the test if the decoder correctly interprets the syntax element under test, and a dramatically corrupted (e.g., spotty or patterned) VERIFY screen is produced at the end of the test if the decoder incorrectly interprets the syntax element under test. Examples of such compliance bitstreams and the coding element tested are described at the Sarnoff Corporation Internet site at: http//:www.sarnoff.com/tech_realworld/broadcast/index.html.

Another bitstream test method is described in U.S. Pat. No. 5,706,002 issued to Meehan et al and entitled "Method and Apparatus for Evaluating the Syntax Elements for DCT Coefficients of a Video Decoder." The Meehan et al arrangement beneficially tests certain decoder functionalities, such as the ability to decode the syntax elements for discrete cosine transform coefficients, encoded in a test bitstream, providing a brightness variation test result indication, but does not test predictive coding features.

An advantage of such a compliance bitstream is that the test result is evident to the observer irrespective of settings of brightness and contrast on the display device displaying the screen display. However, the use of an entire picture (i.e. an "unreferenced" visual test display) to test a feature may tend to limit the testing of certain features because the observer may not be able to discern the subtle differences (small changes in pixel brightness) between a correct decode and an incorrect decode. In addition, it would be desirable to be able to test those coding functions that use image prediction. In certain instances, it may also be desirable, if not necessary, to make a direct comparison of decoder results to evaluate the pass/fail result of the test.

Accordingly, there is a need for a bitstream testing method and a bitstream that can provide compliance testing of various decoders without knowledge of the particular circuit and/or software implementation thereof. Preferably, such testing method will evaluate predictive aspects of the coding and will provide a referenced visual display of a test result for evaluation by an observer.

To this end, the method of the present invention for testing a decoder of a digital bitstream comprises:

applying a test bitstream to the decoder to decode the test bitstream, wherein the test bitstream includes at least one picture representing at least in part a reference image portion, wherein the at least one picture includes a region that is a direct-coded representation of the reference image portion and a region that is an indirect-coded representation of the reference image portion, whereby the decoder produces at least one picture including a decoded direct-coded region representative of the reference image portion and a decoded indirect-coded region representative of the reference image portion; and comparing the decoded direct-coded and decoded indirect-coded regions representative of the reference image portion.

According to another aspect of the invention, a method for producing a test bitstream including a sequence of pictures representing at least a reference image portion, comprises producing a bitstream of at least one picture of the sequence of pictures that includes a region that includes a direct-coded representation of the reference image portion and a region that includes an indirect-coded representation of the reference image portion.

According to another aspect of the invention, apparatus for generating a test bitstream including a sequence of pictures representing at least one reference image portion, comprises a generator of a bitstream of at least one picture of the sequence of pictures that includes a region that is a direct-coded representation of the reference image portion and a region that is an indirect-coded representation of the reference image portion.

According to yet another aspect of the invention, a storage medium encoded with machine-readable computer instructions for producing a coded bitstream wherein the coded bitstream includes a sequence of pictures representative of at least one reference image portion, comprises means for causing a computer to produce a coded bitstream that includes at least one picture of the sequence of pictures that includes a direct-coded representation of the reference image portion and an indirect-coded representation of the reference image portion.

A bitstream in accordance with the invention for testing a decoder comprises a coded representation of a sequence of pictures wherein at least one picture of the sequence of pictures includes a region that is a direct-coded representation of a reference image portion and a region that is an indirect-coded representation of the reference image portion.

BRIEF DESCRIPTION OF THE DRAWING

The detailed description of the preferred embodiments of the present invention will be more easily and better understood when read in conjunction with the FIGURES of the Drawing which include:

FIG. 4 is a representation of a number of exemplary sequences of pictures useful in accordance with one aspect of the invention;

FIGS. 5A and 5B are schematic representations of exemplary test result images illustrating another aspect of the invention;

FIG. 6 is a schematic representation of an alternative exemplary test result image illustrating another aspect of the invention; and FIG. 7 is a schematic representation of additional alternative exemplary test result images illustrating other aspects of the invention.

Figure 1:
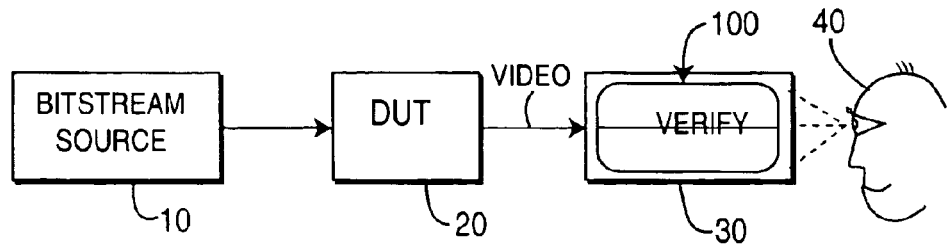
FIG. 1 is a schematic block diagram of a bitstream test arrangement useful in accordance with the invention.

In the Drawing, where an element or feature is shown in more than one drawing figure, the same alphanumeric designation may be used to designate such element or feature in each figure, and where a closely related or modified element is shown in a figure, the same alphanumerical designation primed may be used to designate the modified element or feature. Similarly, similar elements or features may be designated by like alphanumeric designations in different figures of the Drawing and with similar nomenclature in the specification.

DESCRIPTION OF THE PREFERRED EMBODIMENT

The present invention functions for the testing of devices that decode a video bitstream coded in accordance with an MPEG coding standard or an MPEG-like coding standard. An "MPEG" or an "MPEG-like" coding standard refers to the ISO/IEC standards identified above as well as any other coding standard that employs a coding and syntax that can include at least two or more different ways for encoding the same picture information. For example, the two different coding ways may include a direct coding and an indirect coding such as a predictive coding. MPEG includes MPEG-1 and/or MPEG-2 and/or subsequent MPEG standards.

FIG. 1 is a schematic block diagram of a bitstream test arrangement useful in accordance with the invention. Bitstream source 10 may be a computer or other processor having a test bitstream stored in a memory or storage device therein or may simply be a reader of a test bitstream stored on a storage medium, such as a floppy disk, magnetic tape, a compact disk (CD), digital video disk (DVD) or other storage medium. Source 10 may also be a processor that receives video images in either analog or digital format and codes such images in accordance with the method of the invention to generate the test bitstream. The test bitstream from source 10 is applied to a decoder under test (D.U.T.) 20 that receives the test bitstream, decodes the test bitstream in accordance with the decoding circuitry and/or software and/or algorithms therein, and produces therefrom a video signal that is applied to a display device 30, such as a television receiver, television monitor, computer display or other visual display, to produce a visual test result image display 100 thereon. An observer 40 observes the visual test result image 100 which is of a type that includes a reference region so as to clearly depict whether or not the D.U.T. has correctly or incorrectly decoded the test bitstream.

Thus, a video sequence is developed and coded to contain at least two regions that look similar when the video output from a correctly decoding D.U.T. is displayed on a video display. One of the regions contains embedded reference data representing at least a portion of a reference image or a test image. One advantage of the invention is that because of the inclusion of a reference region, comparison of the regions of the test result image provides information concerning the correctness of the functionality of the D.U.T., and, in particular, the prediction functions thereof. The reference region may be stationary or may move.

Figure 2:
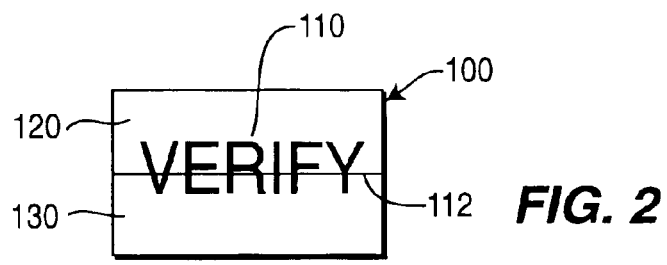
FIG. 2 is a representation of an exemplary test result image on a display device useful in accordance with the invention.

FIG. 2 is a representation of an exemplary test result image 100 as is displayed on a display device 30, useful in accordance with the invention. Test result image 100 has at least two regions 120, 130 that are produced from differently coded portions of the test bitstream. The regions 120, 130 define a dividing line or boundary 112 therebetween, such dividing line not necessarily appearing as a line on the display, but illustrating the location where the two regions 120, 130 are contiguous. Test result image 100 preferably also includes one or more test indicia, for example, one or more marks, icons, symbols, diagrams, alpha-numeric or other characters, or other indicia, that are positioned within test result image 110 preferably so as to be partly in the first region 120 and partly in the second region 130, i.e. partly on one side of dividing line 112 and partly on the other side thereof. In the exemplary test result image of FIG. 2, the indicia 110 is a series of alpha-numeric characters spelling the word "VERIFY" wherein the top of each letter thereof is in region 120 and the bottom of each letter thereof is in region 130. Typically, the backgrounds of both regions are preferably uniform and of the same color, such as grey or another suitable color, and the indicia are preferably of a contrasting color, such as a blue or white.

Because the portion of the bitstream that is decoded to produce region 120 of the test result image 100 of FIG. 2 is coded in one way and the portion of the bitstream that is decoded to produce region 130 thereof is coded in another way, test result image 100 provides a "referenced" visual display, i.e. a visual display in which an observer can directly observe and compare the decoded indicia 110 that was coded in a first way in region 120 to that decoded indicia 110 that was coded in a different way in adjacent region 130. One of the regions contains embedded reference data representative of a reference or test image, i.e. a reference image portion, as described in detail below. Any differences between the regions, which may or may not be evident in an unreferenced display, will be evident in the referenced test result image 100, particularly at the locations where a portion of an indicia 110 intersects dividing line 112. In fact, if the D.U.T. is correctly decoding the test bitstream, the display in regions 120 and 130 will be identical and dividing line 112 will not be visible. If the D.U.T. decodes incorrectly, however, dividing line 112 will be quite evident, for example, as an edge or seam in the image 100.

Under the well known MPEG coding standards, a series of pictures are coded and are transmitted as a sequence of data packets in a digital bitstream. Each picture is coded into a series of lines. Each line includes one or more slices each having one or more macroblocks each containing an array of coefficients representing the values of an array of pixel samples. Each slice and each macroblock therein also includes a header containing coding and syntax data. In a typical video bitstream coded in the MPEG-2 video standard, each picture is coded in 16 lines with each line being one slice, at a rate of, for example, 24, 30 or 60 pictures per second. Each such slice contains 16 macroblocks each coding a 16×16 array of pixel samples.

Picture information is coded into the macroblocks and slices in one of several ways. A picture may be coded as an "I picture," so called because all macroblocks within the picture must be "intra-coded," wherein the pixel samples of each portion of the picture (e.g., each macroblock) are coded using coefficients from a discrete cosine transform (DCT) coded without reference to any other picture or pictures. As used herein, direct coding includes intra-coding. I pictures are used as the basis for prediction of other pictures within a group of pictures (GOP) wherein at least the first picture of a group of pictures must be intra-coded. I pictures are exactly reproduced and so are suitable as reference images, i.e. as pictures or regions thereof containing embedded reference data. A picture may also be coded as a "P picture." A P picture allows macroblocks to be either intra-coded or predictively-coded, i.e. a "predicted" picture, wherein the pixel samples of each portion of the picture (e.g., macroblock) are coded using coefficients from a DCT either intracoded or predictive coded with reference to the last immediately preceding (most recent prior) I picture or P picture. As used herein, indirect coding includes MPEG predictive coding and other predictive coding.

Sequences of coded pictures are represented herein as a sequence of letters wherein "I" represents an I picture and "P" represents a P picture.

Thus in a sequence of pictures I $P_1$ $P_2$ . . . , the I picture is intracoded, the first P picture $P_1$ is either intracoded or is predictively coded from the first coded I picture, and the second P picture $P_2$ is either intracoded or is predictively coded from the first P picture $P_1$, so that the prediction is always based on a prior coded picture and so is forwardly directed. Pictures may also be "B pictures." B pictures are "bidirectionally coded" meaning that they are DCT coded with reference to the last immediately preceding picture that is an I-picture or a P-picture, or with reference to the next immediately following picture that is an I-picture or a P-picture, or with reference to both, i.e. B pictures use forward prediction, backward prediction and bidirectional prediction.

In accordance with the invention, the image 100 shown contains predictive coding (e.g., is a P-picture or a B-picture). One of regions 120, 130 thereof is intra-coded and the other region thereof is predictively coded or is bidirectionally coded. In the description herein, for example, the upper region 120 is intra-coded and the lower region 130 is predictively coded, without limiting the generality of the invention to employ other arrangements and other coding so long as one of the regions of the test result image is intra-coded, thereby to provide a reference image region against which the other region or regions may be compared.

Figure 3:
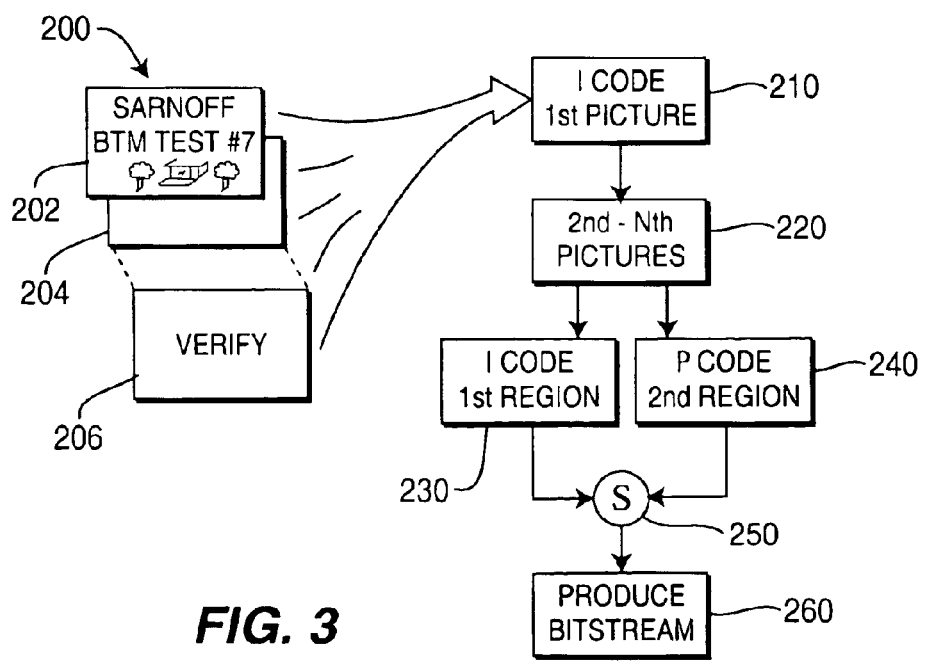
FIG. 3 is a schematic flow diagram of an exemplary method in accordance with the invention, including a representation of an exemplary sequence of test images useful with the invention.

FIG. 3 is a schematic flow diagram of an exemplary method in accordance with the invention, including a representation of an exemplary sequence 200 of test images useful with the invention. Exemplary test images 200 include a number of images 202, 204, . . . , 208 that are applied to a coder for coding in compliance with the applicable coding standard, e.g., an MPEG standard. For example, image 202 may be an introductory image that provides information concerning the test that is to be run, any instructions for the test operator, or other information as desired. Image 204 may be similar or may be a first test image. Images 202, 204 are for convenience and are optional with respect to the invention. Image 208 is the test image that is to be coded in accordance with the invention.

Where the applicable coding standard is an MPEG or MPEG-like coding standard, the entire first picture coding test image 208 is preferably intra-coded 210 so that the coded representation exactly represents reference or test image 208 while coding 220 of the $2^{nd}$ through $n^{th}$ pictures of test image 208 employs two different coding schemes. A first region of the $2^{nd}$ through $n^{th}$ pictures of test image 208 is preferably intra-coded 230 and the second region thereof is preferably predictively coded 240. The intra-coded representation of the first region of test image 208 and the predictively coded representation of the second region thereof are combined 250 to provide coded information representative of a complete picture of test image 208 for each of the $2^{nd}$ through $n^{th}$ pictures. Finally, the test bitstream is produced 260 therefrom, for example, by coding the header and syntax information consistently and correctly in compliance with the coding standard, such as by setting the quantization scale code (QSC) value so that both regions of the picture will appear identical when decoded correctly. For purposes of the exemplary description, the intra-coded first region is the top portion of the picture and the predictively coded second region is the bottom portion of the picture.

In the MPEG-2 coding, a substantially intra-coded picture must precede predictively coded pictures, which include pictures partially intra-coded and partially predictively coded. However, it is noted that while the reference from which the direct coded and indirect coded regions of the pictures comprising a test bitstream in accordance with the invention is preferably a direct coded image, or an I picture in MPEG coding, a completely direct coded or even a substantially direct coded picture is not necessary to the invention. The reference may be, for example, a P picture having one or more intracoded macroblocks, or another picture having at least one region or portion thereof direct coded. The direct coded reference can be any direct coded picture portion that makes possible an unambiguous reference picture or picture portion, and in the limit, the reference need not even include a direct coded (e.g., intra-coded) picture region, but may also be a sequence of predictively coded picture regions that bring a picture to a defined condition.

Thus, the bitstream according to the invention includes a direct coded representation and an indirect coded representation of a reference image portion, which portion can be any desired portion of a picture. Every operative decoder under test should accurately reproduce the direct coded representation of the reference image portion, which reproduction is displayed in the direct coded region of the test result image. Such decoder should also reproduce the indirect coded representation of the reference image portion, which reproduction is displayed in the indirect coded region of the test result image, but which reproduction will be more or less accurate depending upon the extent and degree to which the decoder conforms (or does not conform) to the applicable coding standard.

Various aspects of the predictive decoding performance of the D.U.T. can be separately tested by selecting appropriate coding criteria for the predictively coded region of the picture. For example, each particular motion vector type can be separately tested by specifying the particular type of motion vector to be used in predictively coding the second region of the picture. Similarly, QSC can be set to differing selected values to test the correctness of the QSC decoding of the D.U.T., e.g., at different times.

When the test bitstream so generated is decoded by the D.U.T. 20 to produce a displayed test result image 100, if the two regions thereof, i.e. the intra-coded portion and the predictively coded portion, appear identical, then decoder D.U.T. 20 has correctly decoded the test bitstream and is said to "pass" the decoding test. If the D.U.T. 20 produces a test result image in which the two regions appear different in any one or more of brightness, color intensity, sharpness, edge overshoot or other characteristic that can be directly observed visually on the displayed image or by using a video waveform monitor, oscilloscope or other test instrument, or directly compared as by a computer, then the D.U.T. has not correctly decoded the test bitstream and may be said to have "failed" the decoding test.

FIG. 4 is a representation of an exemplary test bitstream including a number of exemplary sequences S1, S2, S3, S4, S5 of pictures useful in accordance with one aspect of the invention for producing time varying test result images 100 when a decoder incorrectly decodes the test bitstream. Therein the letters I represent I-pictures whereas the letters P represent P pictures using predictive coding in one region thereof and intra-coding in another region thereof. Each sequence includes periodic entirely I pictures which will produce a "pulsing" or pulsation of the test result image 100 if the D.U.T. 20 incorrectly decodes the test bitstream. This is advantageous because the human eye is more sensitive to changing images than it is to static images, thereby improving the ability of the observer to detect small errors. In addition, it is especially useful where decoder 20 is intended for decoding video signals coded for the ATSC digital television (DTV) standard in use in the United States which requires that an I picture be transmitted every 0.6 seconds.

A test bitstream may include such periodic I pictures at regular intervals, such as obtains if the bitstream comprises any one of the sequences S1, S2 . . . repeatedly to produce a constant rate pulsing, or may include ones of the sequences S1, S2 . . . to produce non-constant rate pulsing. Each exemplary sequence S1, S2, . . . illustrated by FIG. 4 is 30 pictures or one second long. Thus sequence S1 will produce a pulsation at a rate of two times per second, sequence S2 at three times per second, S3 at six times per second, S4 at ten times per second and S5 at fifteen times per second A test bitstream including the set of sequences S1, S2, . . . S5 is useful for testing the prediction length of decoder 20, i.e. wherein the time between the initiation of the test bitstream and the onset of detectable pulsing provides an indication of the time it takes for the test result image to degrade, i.e. as the number of pictures having predictively coded regions between entirely intra-coded pictures increases. The number of pictures having predictively coded regions can be counted and displayed as a number inserted at a corner or other convenient location in the test result image 100 as an indication of prediction length, which is useful because some degradation of the predicted image is allowed and is not objectionable to a typical viewer of the video decoded by the D.U.T. 30 in normal use. The observing tester 40 can then evaluate various decoders 30 based on their relative performance in a prediction length test, i.e. how long it takes for the test result image 100 to degrade to the point that prediction decoding errors become objectionable.

The foregoing embodiments of the invention beneficially provide an essentially "pass/fail" or "go/no go" indication of the correctness of the decoding algorithm performed by D.U.T. 30. FIGS. 5A and 5B are schematic representations of an exemplary reference or test image 206 and corresponding test result image 100 illustrating another aspect of the invention in which the test result image 100 provides an indication of "how wrong" the decoding by D.U.T. 30 is. In effect, observer 40 has a "multiple choice" type of test result image 100 to interpret rather than a "true/false" type of test result image 100. To this end, test image 206 of FIG. 5A, which would be part of the sequence of test images 200 described above in relation to FIG. 3, for example, includes a first region 206a that depicts two or more test indicia E1, E2, E3 of varying clarity and a second region 206b that depicts two or more sharp or abrupt test indicia TE1, TE2, TE3. These test indicia E1, E2, E3 typically include a best-case indicia E1 and ones E2, E3 that are filtered or otherwise intentionally degraded indicia derived from the best-case indicia E1 so as to provide indications of varying degrees of reproduction of the best indicia.

Test indicia E1 is, for example, a sharp clean edge whereas test edge E2 is somewhat filtered or otherwise blurred as compared to test edge E1, as would occur with a certain degree of decoding error, and test edge E3 is further filtered or otherwise blurred as compared to test edges E1 and E2, as would occur with a greater degree of decoding error. Region 206a is intra-coded in the pictures encoded in the test bitstream. Each of test indicia TE1, TE2, TE3 in the second region 206b of test image 206 is a sharp, abrupt test edge, and the second region 206b is predictively coded in the second through $n^{th}$ pictures of the test bitstream. Such test bitstream is useful, for example, for testing the transient response of D.U.T. 30.

Thus, the input test image 206 intentionally includes in a first intra-coded region 206a embedded reference data comprising indicia E1, E2, E3 which are indicative of varying degrees of correct and incorrect decoding and in a second predictively coded region 206b indicia TE1, TE2, TE3 indicative of sharp and abrupt edges. If the D.U.T. 30 correctly decodes the test bitstream, then the test result image 100 will be an exact reproduction of test image 206 with three edges of various blurring in the I-decoded top region 120 and three sharp, abrupt edges in the predictively-decoded bottom region 130. If D.U.T. 30 incorrectly decodes the test bitstream there will be some degree of blurring of the test edges of the predictively coded region 130 of the test result image 100, as depicted in FIG. 5B. Therein, the decoded intra-coded test edges IE1, IE2, IE3 are exact replicas of test edges E1, E2, E3, whereas the decoded predictively coded test edges PE1, PE2, PE3, are blurred representations of sharp test edges TE1, TE2, TE3. By comparing the edges PE1, PE2, PE3, blurred by incorrect decoding by D.U.T. 30 to the intentionally blurred edges IE1, IE2, IE3, i.e whether the former are "better" or "worse" than the latter, observer 40 can determine the degree of degradation introduced by D.U.T. 30.

It is noted that while reference or test image 206 is described in terms of six indicia, an actual reference image could comprise a reference image portion that represented any one or more test indicia, e.g., indicia E1. The exemplary single indicia of the reference image portion is coded to be reproduced at plural locations, e.g., six locations, in the test result image. Indicia E1 is directly coded to be reproduced as indicia E1, E2, E3 with the filtering, quantization and other coding parameters selected to suitably "blur" indicia IE2 and IE3 as they are directly decoded and reproduced in the direct coded region of test result image 100. Indicia E1 of the reference image portion is also indirectly or predictively coded to be decoded and reproduced in the indirectly coded region 130 of test result image 100 as test indicia PE1, PE2, PE3.

While slanted edges are shown as exemplary test indicia in FIGS. 5A and 5B, other test indicia may be employed. Such test indicia may be horizontal or vertical edges, geometric shapes such as squares, circles and triangles, color variations, brightness variations, and the like, and may beneficially be positioned so as to lie across the dividing line 207, 112 for ease of direct visual comparison. For example, the error level indicia in the test image can be flat areas differing in brightness by 1 IRE level intra-coded region so as to be brighter and dimmer than corresponding flat areas at the same brightness level in the predictively coded region. Observer 40 then compares the relative brightness change in the decoded predictively coded region 130 of test result image 100 to the reference different brightness levels in the decoded intra-coded region 120 thereof to determine the error level of D.U.T. 30 in decoding predictively coded brightness levels. Several performance characteristics can be tested in one test bitstream, such as by using filtered alphanumeric characters as the test indicia so that the sharpness of decoded predictively coded vertical, horizontal and slanted edges are evaluated together, and further by varying the brightness and/or color content thereof to simultaneously test correctness of decoding of predictively coded brightness levels and color shift.

It is noted that the invention is suited for testing to determine whether the decoded test image contains the same pixel samples in the decoded predictively coded region as in the decoded intra-coded region, thereby making a test for identical pixel samples feasible, contrary to the prior art wherein the test output display relies on relative brightness levels that are sufficiently different as to be visually apparent to an observer. In addition, motion compensation prediction functions are tested by coding a particular motion vector to be used in coding one region of a test image, preferably a region containing at least one test indicia. For example, in the test bitstream a horizontal ½ pixel motion vector is intentionally coded to specify continuous motion in a given direction of one or more pixel regions of the test image in predictively coding one region thereof and an inverse discrete cosine transform (IDCT) coefficient is also intentionally coded to undo or correct the pixel region motion specified by the motion vector. Thus, if the predictively coded region of the test image is correctly decoded by D.U.T. 30, the test result image 100 will reproduce the original test image without motion, as will the decoded intra-coded region thereof. If the test bitstream is not correctly decoded, motion will visible only in the decoded predictively coded region 130 of test result image 100. In like manner, the specified motion vector and IDCT coefficients can be specified to not exactly compensate so that there is an intentional offset introduced into the motion compensation to produce motion if the test bitstream is correctly decoded.

FIG. 6 is a schematic representation of an alternative exemplary test result image 100' illustrating another aspect of the invention in which plural predictively coded regions of a test image 200 are included in each picture so as to test plural decoding characteristics with one test bitstream. One example thereof utilizes plural predictively coded regions 130a, 130b, 130c, 130d, in which different motion vectors are intentionally specified and the in which the corresponding corrective IDCT coefficients are also intentionally specified to remove any motion in a correctly decoded test result image 100', in like manner to that described in the preceding paragraphs.

For example, one advantageous test bitstream produces a test result image 100' wherein differently coded regions 120 and 130 are in contrasting colors, such as black and white or red and green, meeting at a boundary line 112. The predictive coding of the motion vector is then set refer to an offset pixel region of a prior picture to move region 130 in a given direction, in effect to move the boundary line 112 in a given direction. The predictive coding is coded with correction IDCT values to "correct" the pixels in the macroblocks of region 130 that move or are offset over the original position of boundary line 112 to be pixels of the contrasting color. I.e., while the actual boundary 112 between the intra-coded and predictive coded regions contained in the test bitstream moves in the given direction, the pixel values of region 130 are "corrected" to undo that motion in the reproduced image 100', so that a properly decoded bitstream will produce a result image 100' that does not change, i.e. one in which the boundary 112 does not appear to move and the color of regions 120, 130 does not appear to change.

Thus, if intra-coded region 120 is black and predictively coded region 130 is white, and the motion vector is coded to move or offset region 130 upward, the white pixels of region 130 that move above the original position of line 112 are re-coded or corrected to be black, and boundary 112 of the test result image appears stationary. If the D.U.T. does not properly decode the predictively coded data, then line 112 will move or jitter or become irregular, and/or the color of image 100' will be corrupted in some manner, and the improper decoding will be readily apparent to a viewer of test result image 100'. Regions 120, 130 need not be of a single color, but may be patterned or contain lines of text, slashes, alphanumeric characters or other indicia.

In addition, different coding can be employed in each of regions 130a, 130b, . . . For example, the rate of motion or offset of each region could be different with correspondingly different correction IDCT values. Alternatively, the colors of each of these regions 130a, 130b, . . . need not be the same. Further, the bitstream portions representing image portions 120a, 130a, 130b, . . . may all be coded, directly or indirectly, as the case may be, from the same reference image portion.

Similarly, each the plural predictively-coded regions 130a, 130b, . . . of test result image 100' can be differently coded with respect to other coding parameters, such as the prediction of particular macroblocks. For example, while reference region 120 is intra-coded, one region (e.g., 130a) can be predictively coded specifying skipped macroblocks, another region (e.g., 130b) can be predictively coded specifying coded macroblocks, another region (e.g., 130c) can be predictively coded specifying skipped macroblocks on some pictures such as alternating pictures, another region (e.g., 130d) can be predictively coded with motion vector compensation, and so forth. Thus, the correctness of D.U.T. 30 decoding the predictively coded skipped macroblock region 130a can be compared to its correctness in decoding the predictively coded-macroblock region 130b and the predictively coded alternating skipped macroblock region 130c, and all compared against the intra-coded reference region 120. Again, the comparison is based on a reference image portion with respect to which are produced the various direct coded and indirect coded regions of test result image 100'.

While the foregoing has exemplified test bitstreams employing pictures having plural regions some of which regions are intra-coded and some of which are predictively coded, other coding can be employed. For example, a test bitstream according to the invention may include pictures having one or more regions that are intra-coded and one or more regions that are bidirectionally coded. In B picture coding the mathematical calculations necessary to produce the B picture from preceding and/or following anchor pictures, which may be either I-pictures or P-pictures, is much more complex and extensive than is that required to produce P-pictures and so provides a more sensitive and stringent test for the decoder 30 under test. A test bitstream could include, for example, pictures having one or more predictively coded regions that periodically are replaced or are complemented by bidirectionally-coded regions, for comparison to the intra-coded regions thereof. Further, regular or irregular partially bidirectionally coded series of pictures can be utilized in similar manner to the series of partially predictively coded pictures as described above in relation to FIG. 3.

The present invention can be embodied as a computer implemented process or processes and/or apparatus for performing such computer-implemented process or processes, and can also be embodied in the form of a tangible storage medium containing a computer program or other machine-readable instructions (herein "computer program"), wherein when the computer program is loaded into a computer or other processor (herein "computer") and/or is executed by the computer, the computer becomes an apparatus for practicing the invention and generating a test bitstream according to the invention. Storage media for containing such computer program include, for example, floppy disks and diskettes, compact disks (CD)-ROMs (whether or not writeable), DVD digital disks, RAM and ROM memories, computer hard drives and back-up drives, and any other storage medium readable by a computer. The invention can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the invention and generating a test bitstream according to the invention. The invention may be implemented on a general purpose microprocessor or on a digital processor specifically configured to practice the invention. When a general-purpose microprocessor is employed, the computer program code configures the circuitry of the microprocessor to create specific logic circuit arrangements.

As used herein, image and/or information are used interchangeably with respect to what is displayed on a display device, and are intended to encompass any and all of the wide variety of displays that a user may desire, including, but not limited to, visual images and pictures, whether still or moving, whether generated by a camera, computer or any other source, whether true, representative or abstract or arbitrary, whether or not including symbols or characters such as alphanumeric characters or mathematical notations, whether displayed in black and white, monochrome, polychrome or full color.

While the present invention has been described in terms of the foregoing exemplary embodiments, variations within the scope and spirit of the present invention as defined by the claims following will be apparent to those skilled in the art. For example, while the coding regions of the test images and test result images herein have been described in terms of a generally horizontal dividing of the image into differently coded regions, other arrangements of the various coding regions of the test image are included and may be desirable. The intra-coded region 120 may be on the bottom and the predictively coded region 130 may be on the top of a test result image 100, and the regions need not be regular in shape nor equal or equivalent in size.

Accordingly, FIG. 7 is a schematic representation of additional alternative exemplary test result images 100 illustrating other aspects of the invention relating to the size, shape and arrangement of the differently coded regions. Exemplary test result image 100a is divided vertically along line 112a to have an intra-coded region 120 (indicated by the letter "I") on the left and a predictively coded region 130 (indicated by the letter "P") on the right. Exemplary test result image 100b has a circular or other conveniently shaped predictively coded region 130 interleaved with or surrounded by an intra-coded region 120' and divided by line 112b therebetween. Exemplary test result image 100c has triangular intra-coded and predictively coded regions separated by a "diagonal" dividing line 112c, and may also have additional Intra-coded and predictively coded regions to provide alternating or interleaved diagonal intra-coded and predictively coded stripes (shown in phantom along with dividing lines 112c'). It is noted that because macroblocks must be "square," i.e. must be "n" by "n" pixels, diagonal line 112c will actually be zigzag or staircase-like. Exemplary test result image 100d is divided horizontally by line 112 and vertically by line 112d to have a rectangular array of interleaved rectangular intra-coded and predictively coded regions.

Further, in any of the foregoing arrangements, the intra-coded and predictively coded regions may be interchanged, may be shifted vertically or horizontally or both, may be stationary or moving such as by being scanned or swept across the test result image, and so forth. When the predictively coded region is in motion, it will not be perceived in the observed test result image if the decoder correctly decodes the test bitstream, but will be very evident and appear as a moving disturbance in the test result image if the decoder incorrectly decodes the test bitstream.

It is noted that while the first picture of a GOP has been described as an I picture, it could be a P picture having all or substantially all or as few as one of its macroblocks intra-coded. I.e. a partially intra-coded P picture or other indirectly coded picture can serve the same purpose as can an I picture or other directly coded pictures and B pictures and other indirectly and predictively be employed for like purposes where a predictively coded region is desired.

What is claimed is:

1. A method for testing a decoder of a digital bitstream comprising:

applying a test bitstream to the decoder being tested to decode the test bitstream, wherein the test bitstream includes at least one picture representing at least in part a reference image portion, wherein the at least one picture includes a region that is a direct-coded representation of the reference image portion and a region that is an indirect-coded representation of the reference image portion, whereby the decoder produces at least one picture including a decoded direct-coded region representative of the reference image portion and a decoded indirect-coded region representative of the reference image portion; and comparing the decoded direct-coded and decoded indirect-coded regions representative of the reference image portion produced by the decoder being tested.

2. The method of claim 1 wherein the direct-coded representation is intra-coded, and wherein the indirect-coded representation is one of predictively coded and bidirectionally-coded.

3. The method of claim 1 wherein the test bitstream is one of an MPEG and an MPEG-like bitstream.

4. The method of claim 1 wherein the reference image portion includes at least on indicia, at least a portion of the indicia being in the region that is a direct-coded representation of the reference image portion and at least a portion of the indicia being in the region that is an indirect-coded representation of the reference image portion, and wherein said comparing includes comparing the respective portions of the indicia in the decoded direct-coded and decoded indirect-coded regions.

5. The method of claim 1 wherein said the test bitstream includes at least one additional picture of a sequence of pictures that is a direct-coded representation of the reference image portion and that follows the at least one picture that includes direct coded and indirect coded representation of the reference image portion.

6. The method of claim 5 further comprising repeatedly inserting the additional picture into the sequence of pictures at one of regular and irregular intervals.

7. A method for producing a test bitstream for testing a decoder wherein the test bitstream includes a sequence of pictures representing at least a reference image portion, comprising:

producing a bitstream of at least one picture of the sequence of pictures, wherein the at least one picture includes a region that includes a direct-coded representation of the reference image portion and a region that includes an indirect-coded representation of the reference image portion, wherein the regions including the direct-coded and indirect-coded representation of the reference image portion of the at least one picture when decoded by a decoder being tested and compared test the decoder being tested.

8. The method of claim 7 wherein the direct-coded representation is intra-coded, and wherein the indirect coded representation is one of predictively coded and bidirectionally-coded.

9. The method of claim 7 wherein producing a bitstream includes producing one of an MPEG bitstream and an MPEG-like bitstream.

10. The method of claim 7 wherein the reference image portion has at least one indicia, at least a portion of the indicia being in the region that is a direct-coded representation of the reference image portion at least a portion of the indicia being in the region that is an indirect-coded representation of the reference image portion.

11. The method of claim 7 further comprising producing in the bitstream at least one additional picture of the sequence of pictures that is a direct-coded representation of the reference image portion and that follows the at least one picture that includes direct coded and indirect coded representation of the reference image portion.

12. The method of claim 11 further comprising repeatedly inserting the additional picture into the sequence of pictures at one of regular and irregular intervals.

13. Apparatus for generating a test bitstream for testing a decoder wherein the test bitstream includes a sequence of pictures representing at least one reference image portion, comprising:

a generator of a bitstream of at least one picture of the sequence of pictures, wherein the at least one picture includes a region that is a direct-coded representation of the reference image portion and a region that is an indirect-coded representation of the reference image portion, wherein the regions including the direct-coded and indirect-coded representation of the reference image portion of the at least one picture when decoded by a decoder being tested and compared test the decoder being tested.

14. The apparatus of claim 13 wherein the direct coded representation is intra-coded and wherein the indirect coded representation is one of predictively coded and bidirectionally-coded.

15. The apparatus of claim 13 wherein said generator includes a generator of one of an MPEG bitstream and an MPEG-like bitstream.

16. The apparatus of claim 13 in combination with:

means for applying the bitstream from said generator to a video decoder, wherein the video decoder decodes the bitstream;

means coupled to said video decoder for observing a decoder image having a first decoded region responsive to the direct-coded representation of the reference image portion and a second decoded region responsive to the indirect-coded representation of the reference image portion.

17. The apparatus of claim 13 wherein the reference image portion has at least one indicia, at least a portion of the indicia being in the region that includes a direct-coded representatives of the reference image portion and at least a portion of the indicia being in the region that includes a indirect-coded representation of the reference image portion.

18. The apparatus of claim 13 wherein said generator of a bitstream further generates at least one additional picture of the sequence of pictures that is a direct-coded representation of the reference image portion and that follows the at least one picture that includes direct coded and indirect coded representations of the reference image portion.

19. The apparatus of claim 18 wherein said generator repeatedly inserts the additional picture into the sequence of pictures at one of regular and irregular intervals.

20. A bitstream for testing a decoder comprising a coded representation of a sequence of pictures wherein at least one picture of the sequence of pictures includes a region that is a direct-coded representation of a reference image portion and a region that is an indirect-coded representation of the reference image portion, wherein the regions including the direct-coded and indirect-coded representations of the reference image portion of the at least one picture when decoded by the decoder and compared test the decoder.

21. The bitstream of claim 20 wherein the indirect coded representation is one predictively coded and bidirectionally-coded.

22. The bitstream of claim 20 wherein the bitstream is one of an MPEG bitstream and an MPEG-like bitstream.

23. The bitstream of claim 20 wherein the reference image portion.

24. The bitstream of claim 20 further including at least one additional picture of the sequence of pictures that includes a direct-coded representation of the reference image portion and that follows at least some of the pictures of the sequence of picture.

25. The bitstream of claim 24 wherein the additional picture of the sequence of pictures that includes a direct-coded representation of the reference image portion is repeatedly inserted into the sequence of pictures at one of regular and irregular intervals.

26. A storage medium encoded with machine-readable computer instructions for producing a coded bitstream wherein the coded bitstream includes a sequence of pictures representative of at least one reference image portion, comprising:

means for causing a computer to produce a coded bitstream that includes at least one picture of the sequence of pictures, wherein the at least one picture includes a direct-coded representation of the reference image portion and an indirect-coded representation of the reference image portion, wherein the regions including the direct-coded and indirect-coded representations of the reference image portion of the at least one picture when decoded by a decoder being tested and compared test the decoder being tested.

27. The storage medium of claim 26 wherein said means for causing a computer to produce a bitstream includes means for causing the computer to produce an intra-coded representation of the reference image portion.

28. The storage medium of claim 26 wherein said means for causing a computer to produce a bitstream includes means for causing the computer to produce one of a predictively coded and a bidirectionally-coded representation of the reference image portion.

29. The storage medium of claim 26 wherein said means for causing a computer to produce a bitstream produces one of an MPEG bitstream portion and an MPEG-like bitstream portion.

* * * * *